No. 811,194. PATENTED JAN. 30, 1906.
J. A. BARCLAY.
SCALE PIVOT BEARING.
APPLICATION FILED NOV. 30, 1904.
2 SHEETS—SHEET 2.
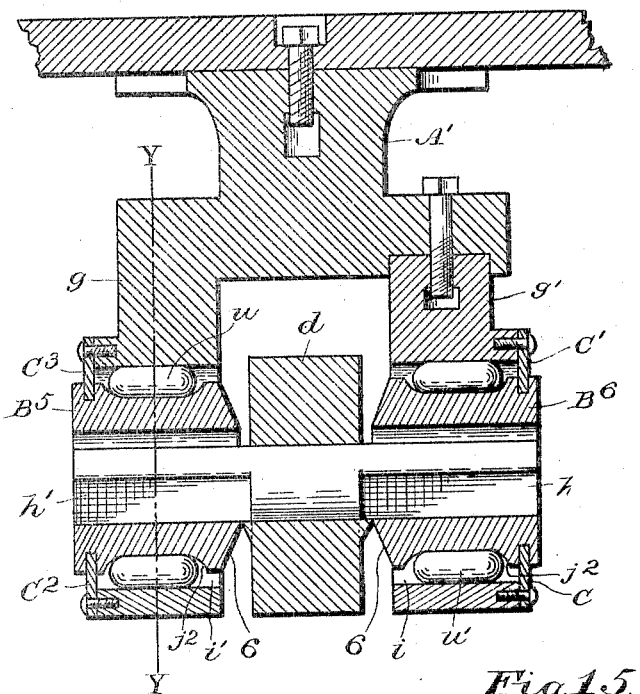
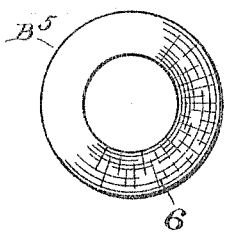
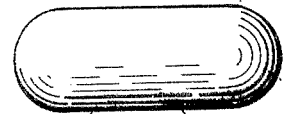
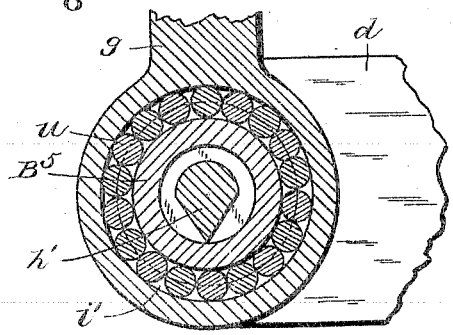
Witnesses
E. R. Martin.
Stella Snider.
Inventor
James A. Barclay,
by E. T. Silvius,
Attorney

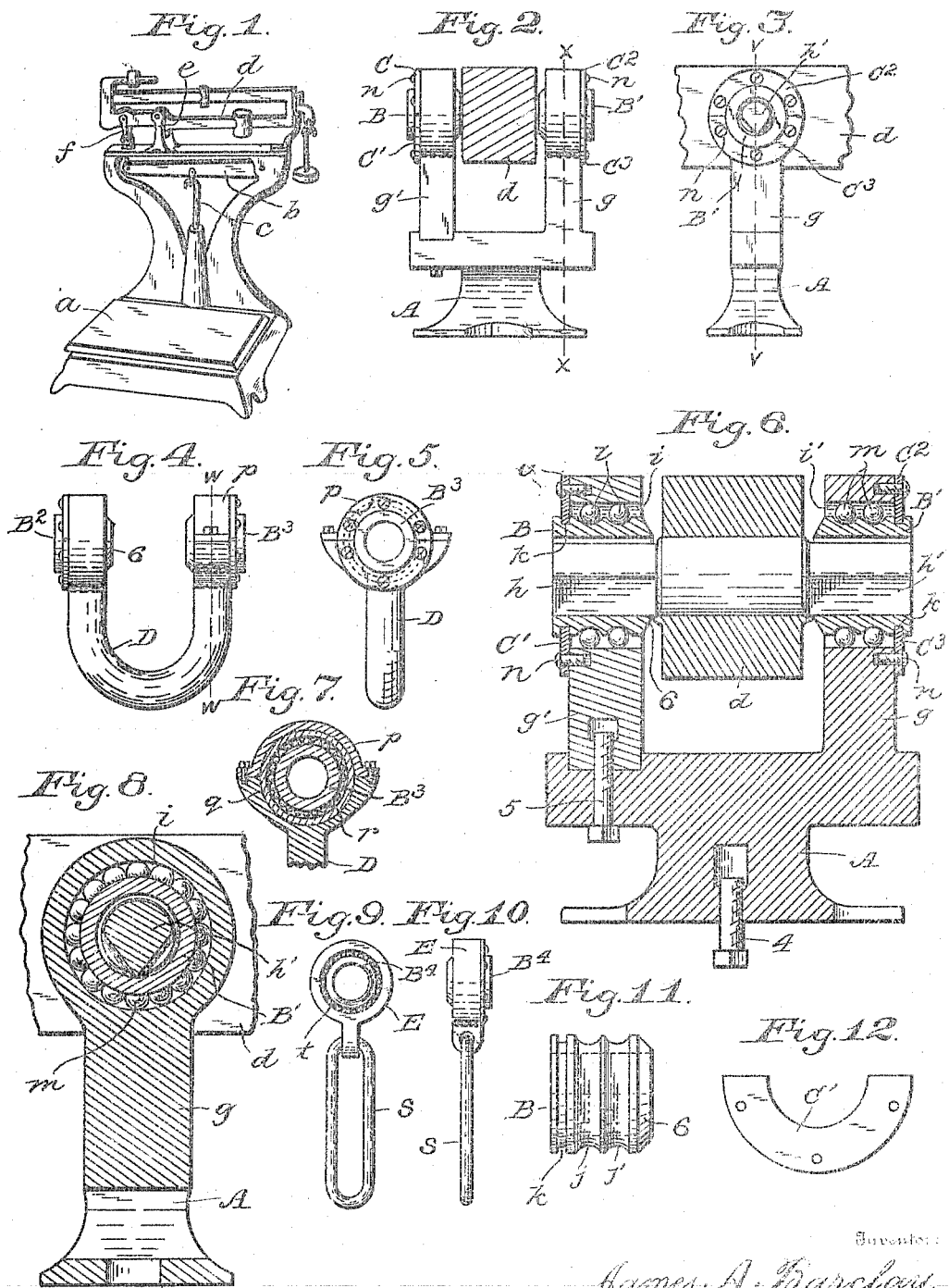

UNITED STATES PATENT OFFICE.

JAMES A. BARCLAY, OF INDIANAPOLIS, INDIANA.

SCALE PIVOT-BEARING.

No. 811,194.          Specification of Letters Patent.          Patented Jan. 30, 1906.

Application filed November 30, 1904. Serial No. 234,836.

*To all whom it may concern:*

Be it known that I, JAMES A. BARCLAY, a citizen of the United States, residing at Indianapolis, in the county of Marion and State of Indiana, have invented new and useful Improvements in Scale Pivot-Bearings; and I do declare the following to be a full, clear, and exact description of the invention, reference being had to the accompanying drawings, and to the letters and figures of reference marked thereon, which form a part of this specification.

This invention relates to bearings for the pivots of the beams and levers of weighing-scales, and it has reference particularly to self-adjusting antifrictional bearings adapted to support especially knife-edge forms of pivots of the character that are provided in scale construction.

In the use of flat bearings for scale-pivots the beams and levers may move somewhat in horizontal radial directions without becoming unbalanced, and it being an advantage to avoid repeated balancing of beams and levers efforts have heretofore been made to provide bearings that will insure constant balance of the beams and levers and at the same time hold them in their proper positions, since by the use of flat bearings the levers and beams may change their positions, which is an undesirable result. To overcome the difficulties, concave bearings and V-shape bearings have been employed with some degree of success, yet on either of these bearings a beam may change balance if its pivot edge is moved slightly from the position in which it rested when the beam was balanced, and this may occur when the pivot is forced up an inclined side of the bearing, and especially after the knife-edge of the pivot may have become worn.

The object of the present invention is to overcome the difficulties above referred to and to provide bearings that may embrace the advantages of the former types of bearings without including their weaknesses or faults, to provide pivot-bearings which will be self-adjusting, embodying the virtues of flat bearings, partaking of the character of swinging bearings, that will cause the beams to settle back to their proper positions when swayed to either side, that will not cause scraping and wear of the edges of the pivots, and that will have rolling contact with the pivot edges, and thereby conduce to the life of the pivots as well as the bearings, and that will not cause the beams to change balance when swayed or moved endwise.

A further object is to provide improved pivot-bearings that may be employed with equal advantages on stand-supports, in side brackets, in loops, and in suspended links.

The invention consists in the combination, with scale-pivots, of bearings having rolling contact with the pivots, rolling supports for the bearings, and novel housings for the bearings and supports; and the invention consists, further, in the parts and combinations and arrangements of parts, as hereinafter particularly described, and pointed out in the claims, forming parts of this specification.

Referring to the drawings, Figure 1 is a perspective view of a weighing-scale which serves to illustrate the character of the apparatus with which the invention is designed to be connected; Fig. 2, a transverse sectional view of a scale-beam and an elevation of a stand-support having the improved bearings supporting the beam; Fig. 3, a fragmentary side elevation of the beam and the stand-support, showing an end of one of the improved bearings; Fig. 4, an elevation of a scale-loop having the improved pivot-bearings therein; Fig. 5, an elevation of the loop viewed at right angles to the view in Fig. 4; Fig. 6, a vertical central sectional view on the line V V in Fig. 3; Fig. 7, a vertical sectional view on the line W W in Fig. 4; Fig. 8, a vertical sectional view on the line X X in Fig. 2; Fig. 9, an elevation of a bearing designed to be used in the corners of scale-platform frames; Fig. 10, an elevation of the bearing shown in Fig. 9 viewed at right angles thereto; Fig. 11, a side view of one of the improved pivot-bearings; Fig. 12, an elevation of one of the bearing-guides; Fig. 13, a vertical central sectional view similar to Fig. 6 with the stand inverted and the bearings having oblong roller-supports; Fig. 14, an end view of one of the bearings; Fig. 15, a side view of one of the oblong rollers; Fig. 16, a fragmentary vertical sectional view on the line Y Y in Fig. 13, and Fig. 17 a side view of one of the bearings adapted to be used with the oblong rollers.

Similar reference characters in the several figures of the drawings designate corresponding parts or features.

In the drawings, *a* designates a scale-platform, *b* a pivoted lever, *c* a connecting-rod or link, *d* a scale-beam, *e* a stand-bearing supporting the beam, and *f* a loop connection between the rear end of the beam and the lever b, all of well-known forms of construction.

Figs. 2, 3, 6, and 8 show improved bearing-stands suitable for use in the position of the stand-bearing e. Figs. 4, 5, and 7 show improved loops and bearings suitable for use in the position of the loop f. Figs. 9 and 10 show suspension-links and bearings suitable for use, inverted in pairs, for supporting the levers under the platforms of the scales. Various other shapes of bearing-supports may be provided as necessities may indicate. Fig. 13 shows a drop-support that is adapted to be arranged also as an upright stand or as a horizontal bracket-support, and the support shown in Fig. 16 may obviously be inverted.

The bearing-stand A comprises a suitable base and two upright arms $g$ and $g'$, and in the arms are supported the pivots $h$ and $h'$ of the beam $d$. The stand is designed to be secured by a screw-bolt 4 either upon or beneath a pillow-cap, and it may also be secured against a vertical support and project horizontally, if required. One of the arms $g'$ is fitted detachably to the base of the stand and is secured by a screw-bolt 5 to the base. In the ends of the arms, which form housings, are circular bores $i$ $i'$, in which are arranged the bearings B and B' of identical form, each bearing, as B, Fig. 11, being circular and hollow and having external grooves $j$ $j'$ serving as ball-races, the bearing having a conical inner end 6 and also having a guide-groove $k$. Balls $l$ and $m$ are interposed in the bores $i$ and $i'$ between the walls thereof and the bearings in the ball-races thereof. Guides C C' are secured to the outer face of the arm $g'$ and extend into the guide-groove of the bearing B, and similar guides $C^2$ $C^3$ are provided for the companion bearing B', the guides being secured by screws $n$. The guides permit free movements of the bearings on the balls rotatively while retaining the bearings in the bores of the arms. The conical ends 6 provide thin edges, against which the sides of the beam may at times have contact with the least amount of friction. The diameters of the pivots are somewhat less than the internal diameters of the bearings, so that while the knife-edges of the pivots rest upon the inner walls of the bearings the bodies of the pivots may move in the bearings in response to the swaying of the beam during weighing operations.

In the clevis-form loop D are arranged bearings $B^2$ and $B^3$ like the bearing B. One arm of the loop is adapted to be parted, having a removable end $p$, which binds an annular lining $q$ in the bore of the arm, the balls $r$ running against the lining.

The loop E is attached to a link $s$ and has a bearing $B^4$, also like the bearing B, supported directly by balls $t$ in the manner above described. The loop may support the link or the link may support the loop, as occasion may require, the latter relative arrangement being preferable.

It should be understood that while balls or spherical rollers are herein referred to the term is intended to refer equally well to cylindrical or oblong rollers as the direct means of support for the pivot-bearings.

The cylindrical rollers $u$ and $u'$ are shown in the two-arm drop-support A', Fig. 13, which is substantially the same in form as the stand A. In the arms $g$ and $g'$ of the support A' are the bearings $B^5$ and $B^6$, having each a broad groove $j^2$, in which the rollers are guided, the bearings having also the guide-groove $k$ to receive the guides, above described, that are attached to the arms.

In practical use any portion of the inner wall of a bearing may support directly the pivotal contact, since the bearings may rotate and the point of contact will always be under a load in a vertical plane. If the beam or lever be moved sidewise, the edges of the pivots may move slightly from their natural gravity positions, but must again gravitate thereto, thus preserving the balance, and when the pivots move laterally the bearings will roll under them, avoiding the scraping of the knife-edges of the pivots.

Having thus described the invention, what is claimed as new is—

1. A weighing-scale including a housing, a knife-edge pivot in the housing, a bearing movable freely in the housing and having a curved bearing-surface in engagement with the knife-edge of the pivot, rollers coöperating with the housing and the bearing, and a lever or beam secured to the knife-edge pivot.

2. A weighing-scale including a movable housing having an annular bearing mounted movably therein with rollers coöperating with the housing and the bearing, a V-shape pivot having the knife-edge thereof in contact with the annular bearing, and a lever or beam secured to the pivot adjacent to the annular bearing.

3. A weighing-scale including a supported housing having a circular bore of uniform diameter, an annular bearing movable in the bore of the housing and having a bore of uniform diameter, rollers between the exterior of the bearing and the wall of the housing and retained therein by said bearing, means attached to the housing retaining the bearing therein, a knife-edge pivot having the edge thereof in contact with the bore of said bearing with a lever or beam secured to the pivot adjacent to and guided by said bearing, said bearing having a conical annular end presented to said lever or beam.

4. In a weighing-scale, an improved annular bearing having an unobstructed interior of uniform diameter and having a groove in the exterior thereof, the bearing being longer at the inner side than at the outer side thereof, in combination with rollers in said groove supporting the bearing movably, a knife-edge pivot engaging the interior of said bearing, and a lever or beam secured to the pivot adjacent to the bearing with a projection thereof coöperating with the longer portion of said bearing.

5. In a weighing-scale, the combination with a lever or beam and with a knife-edge pivot thereof, of a housing having rollers coöperating therewith, a bearing coöperating with the rollers of the housing and having a curved bearing-surface in engagement with the knife-edge of the pivot.

6. In a weighing-scale, the combination with the levers and beams and the knife-edge pivots thereof, of housings supported by the scale structure, bearings movable in the housings in engagement with the knife-edges of the pivots and guiding the levers and beams, rollers in the housings supporting the bearings and retained therein by the bearings, and means for retaining the bearings in the housings.

In testimony whereof I affix my signature in presence of two witnesses.

JAMES A. BARCLAY.

Witnesses:
  WM. H. PAYNE,
  E. T. SILVIUS.